(12) United States Patent
Sureka

(10) Patent No.: US 12,026,526 B2
(45) Date of Patent: Jul. 2, 2024

(54) VISUALLY DIFFERENTIATING AND MERGING OIL-GAS DATA USING A MAPPING USER INTERFACE

(71) Applicant: Schlumberger Technology Corporation, Sugar Land, TX (US)

(72) Inventor: Atul Sureka, Pune (IN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/597,294

(22) PCT Filed: Jul. 8, 2020

(86) PCT No.: PCT/US2020/041107
§ 371 (c)(1),
(2) Date: Dec. 30, 2021

(87) PCT Pub. No.: WO2021/007271
PCT Pub. Date: Jan. 14, 2021

(65) Prior Publication Data
US 2022/0276880 A1 Sep. 1, 2022

Related U.S. Application Data

(60) Provisional application No. 62/871,895, filed on Jul. 9, 2019.

(51) Int. Cl.
*G06F 9/451* (2018.01)
*E21B 47/00* (2012.01)
(Continued)

(52) U.S. Cl.
CPC .............. *G06F 9/451* (2018.02); *E21B 47/00* (2013.01); *G06F 3/04817* (2013.01); *G06F 3/04842* (2013.01); *E21B 2200/20* (2020.05)

(58) Field of Classification Search
CPC .. G06F 9/451; G06F 3/04817; G06F 3/04842; E21B 47/00; E21B 2200/20
See application file for complete search history.

(56) References Cited

U.S. PATENT DOCUMENTS

| 8,743,134 B2* | 6/2014 | Brugler ............... G06F 3/04817 |
| | | 715/764 |
| 2010/0206559 A1* | 8/2010 | Sequeira, Jr. .......... G01V 99/00 |
| | | 166/250.15 |

(Continued)

FOREIGN PATENT DOCUMENTS

WO 2018-182691 A1 10/2018

OTHER PUBLICATIONS

International Search Report and Written Opinion for the Equivalent PCT/US2020/041107 dated Oct. 27, 2020 (11 Pages).

*Primary Examiner* — Tadesse Hailu
*Assistant Examiner* — Darrin Hope
(74) *Attorney, Agent, or Firm* — Michael Guthrie

(57) ABSTRACT

A method includes accessing a first well header dataset from a first repository; accessing a second well header dataset from a second repository; identifying matches and mismatches between data within the first well header dataset and data within the second well header dataset using information identifying different formats of the first well header dataset and the second well header dataset; and presenting, within a mapping interface, graphical representations of the matches and mismatches between the data within the first well header dataset and the data within the second well header dataset in a mapping interface.

18 Claims, 6 Drawing Sheets

(51) Int. Cl.
*G06F 3/04817* (2022.01)
*G06F 3/04842* (2022.01)

(56) References Cited

U.S. PATENT DOCUMENTS

| | | |
|---|---|---|
| 2010/0212909 A1 | 8/2010 | Baumstein et al. |
| 2012/0261135 A1* | 10/2012 | Nowak ................. G01V 1/301 |
| | | 702/14 |
| 2013/0103319 A1 | 4/2013 | Buiting et al. |
| 2015/0106074 A1* | 4/2015 | Courtade ................ G06F 30/20 |
| | | 703/6 |
| 2017/0324753 A1* | 11/2017 | Pulis ................... G06F 21/6218 |
| 2018/0372901 A1 | 12/2018 | Wang et al. |
| 2019/0138995 A1* | 5/2019 | Currin ................. G06Q 10/103 |

\* cited by examiner

VISUALLY DIFFERENTIATING AND MERGING OIL-GAS DATA USING A MAPPING USER INTERFACE

CROSS-REFERENCE TO RELATED APPLICATIONS

This application claims priority to U.S. Provisional Patent Application 62/871,895, which was filed on Jul. 9, 2019, and is incorporated herein by reference in its entirety.

BACKGROUND

Multiple oil-gas domain software applications exist in which each application maintains its own data repository. Examples may include seismic interpretation applications, drilling exploration applications, oil-gas recovery and production estimate applications, wellbore analysis applications, etc.

SUMMARY

Embodiments of the disclosure may provide a method including accessing a first well header dataset from a first repository; accessing a second well header dataset from a second repository; identifying matches and mismatches between data within the first well header dataset and data within the second well header dataset using information identifying different formats of the first well header dataset and the second well header dataset; and presenting, within a mapping interface, graphical representations of the matches and mismatches between the data within the first well header dataset and the data within the second well header dataset in a mapping interface.

Embodiments of the disclosure may also provide a computing system, including one or more processors; and a memory system comprising one or more non-transitory computer-readable media storing instructions that, when executed by at least one of the one or more processors, cause the computing system to perform operations. The operations may include accessing a first well header dataset from a first repository; accessing a second well header dataset from a second repository; identifying matches and mismatches between data within the first well header dataset and data within the second well header dataset using information identifying different formats of the first well header dataset and the second well header dataset; and presenting, within a mapping interface, graphical representations of the matches and mismatches between the data within the first well header dataset and the data within the second well header dataset in a mapping interface.

Embodiments of the disclosure may further provide a non-transitory computer-readable medium storing instructions that, when executed by one or more processors of a computing system, cause the computing system to perform operations. The operations may include accessing a first well header dataset from a first repository; accessing a second well header dataset from a second repository; identifying matches and mismatches between data within the first well header dataset and data within the second well header dataset using information identifying different formats of the first well header dataset and the second well header dataset; and presenting, within a mapping interface, graphical representations of the matches and mismatches between the data within the first well header dataset and the data within the second well header dataset in a mapping interface.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
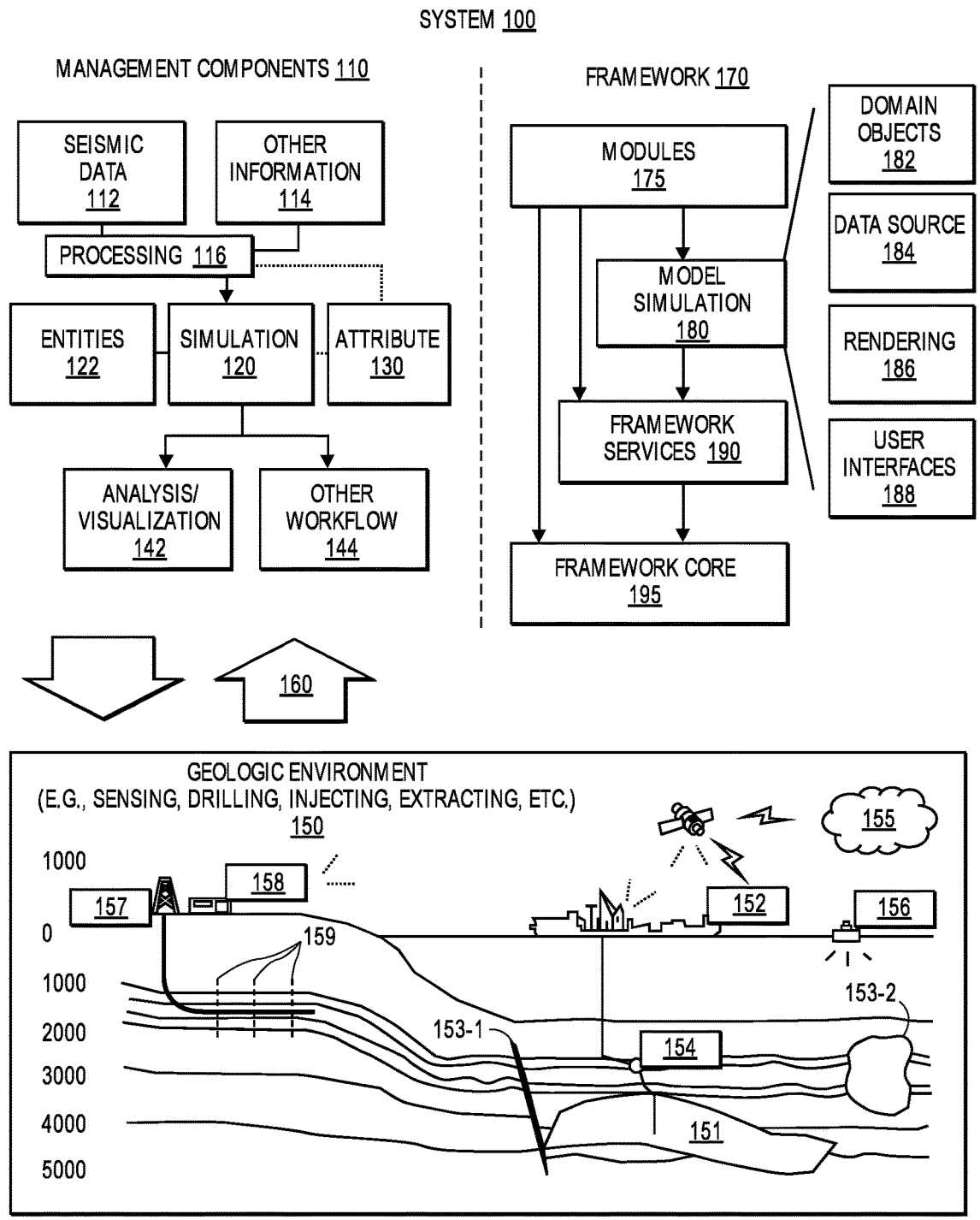
FIG. 1 illustrates an example of a system that includes various management components to manage various aspects of a geologic environment, according to an embodiment.

During different phases of the oil production life cycle (e.g., exploration, development & production), data may be transferred from one software product to another. For example, different software products may be used for different life cycle phases and for various different types of analysis. The different software products store data in different ways (e.g., in different structures, formats, and different types of repositories). As such, data visualization and data transfer from one data repository to another complex. More specifically, it may be difficult for a user to differentiate between information between different data repositories. As such, identifying data of interest to transfer/merge may be difficult and time consuming. Accordingly, one or more techniques, described herein, may streamline the comparing and/or transferring of data from multiple different data repositories associated with different types of oil-gas domain software applications. In some embodiments, aspects of the present disclosure may include a system and/or method to improve user interface technology used to present oil production life cycle data by improving the presentation of data within the user interface. For example, the systems and/or methods, described herein, may improve the accuracy in which data is presented within a user interface such that data transferring and merging of data from separate repositories may be improved by improving the identification of data having specific types of properties. As such, the accuracy of data identification (e.g., for transferring the data, analyzing the data, etc.) is improved by improving the user interface by which the data is presented.

Aspects of the present disclosure may provide data manager application with the ability to connect, compare, and initiate data transfer between two data repositories. In some embodiments, the data manager application may present a well top and seismic lines of two (or more) repositories side by side on a map canvas. In some embodiments, two map instances (one for each repository) may be presented side by side. In this way, a user may navigate to any location and easily compare the well headers to find differences between the well headers. Additionally, or alternatively, the user may select wells from one repository and initiate a transfer of corresponding data to other wells for comparison.

In some embodiments, an application and/or add-on to an existing application may be provided to visually compare data from two different repositories (e.g., well headers of two or more repositories). The techniques described herein allow a user to load and visualize repository data on a map canvas. For example, two (or more) instances of map canvas may be loaded data from one repository. In some embodiments, both instances may appear side by side linked together and each instance may show the map location and zoom level. In this way, a user may pan or zoom the map on one side, resulting in the other instance also panning and zooming to show the same geographical location on map. In some embodiments, icons having different colors, patterns, images, and/or shadings may be presented to compare data between the repositories (e.g., compare data representing well tops having a particular set of selected properties). In this way, a user may more easily find the data having a particular set of properties that is present in one repository but missing in another and vice versa. Further, the user may select to transfer or merge data from one repository to another such that both repositories are updated with up to date information.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE' reservoir simulator (Schlumberger Limited, Houston Texas), the INTERSECT' reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
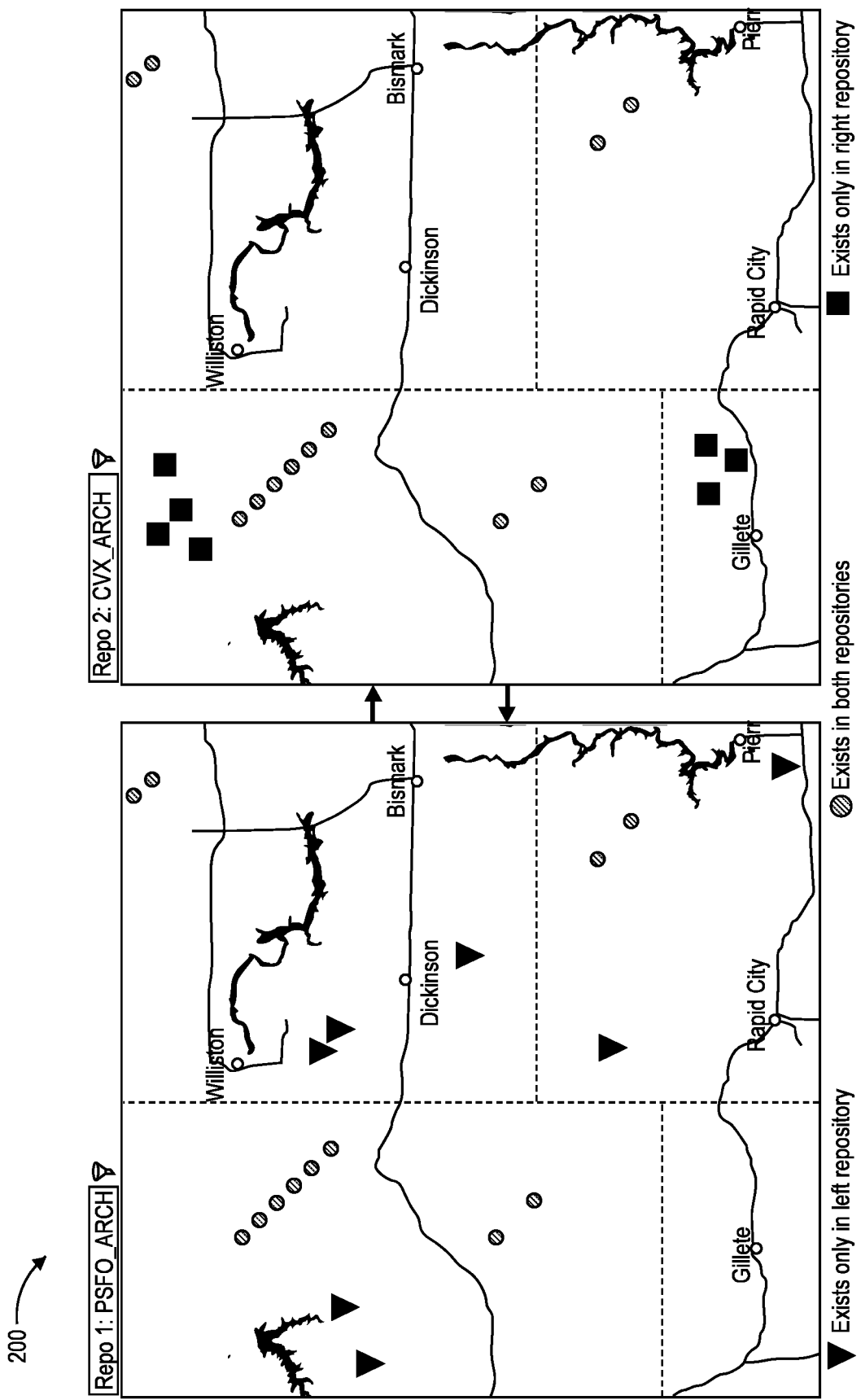
FIG. 2 illustrates an example of a presentation of a comparison of well top location datasets from two different data repositories.

FIG. 2 illustrates an example of a presentation of a comparison of well top location datasets from two different data repositories within a user interface of a data viewing and transfer application in accordance with aspects of the present disclosure. More specifically, FIG. 2 illustrates a user interface 200 of a data viewing and transfer application. As shown in FIG. 2, the user interface 200 may present two maps (e.g., side-by-side) in which each map shows the same user-selected geographic area and well header data having a selected set of properties that is present in different datasets stored in different repositories. For example, datapoints presented in the left-hand side map may represent well header data of selected properties included in a first data repository, and the data, and datapoints presented in the right-hand side of the map may represent well header data of selected properties included in a second data repository.

In the example of FIG. 2, well top location data is shown from two different repositories, although in practice, different well header properties may be shown (e.g., well-state—DRY, ACTIVE, OIL PRODUCING). Well header data with selected properties that is present in both datasets may be represented as icons having one color (e.g., blue) and/or shape (e.g., circle). Well header data that is present in only the first of the two repositories (e.g., shown on the left-hand side) may be represented as icons having a different color (e.g., red) and shape (e.g., triangle). Well header data that is present only in the second of the two repositories (e.g., shown on the right-hand side) is represented as icons having a different color (e.g., purple) and shape (e.g., rectangle). In this way, the user may more clearly identify the repositories having well data with a selected set of properties. Further, the user may apply filters on each repository to narrow down wells list. This filter can be applied on a selected set of properties.

In some embodiments, the user may provide user input to transfer data from an origin repository to a target repository. More specifically, the user may select one or more datapoints from either of the side of the map and initiate a transfer for the data represented by the datapoint to the other repository. As one illustrative example, the user may select one of the datapoints in the shape of a triangle on the left-hand side map (e.g., data stored in the origin repository of the left-hand side map) and select a command to transfer the data represented by this datapoint to the repository of the right-hand side map (e.g., a target repository). With this approach, the user may easily identify the differences between two different datasets and merge data of interest between two (or more) repositories.

Figure 3:
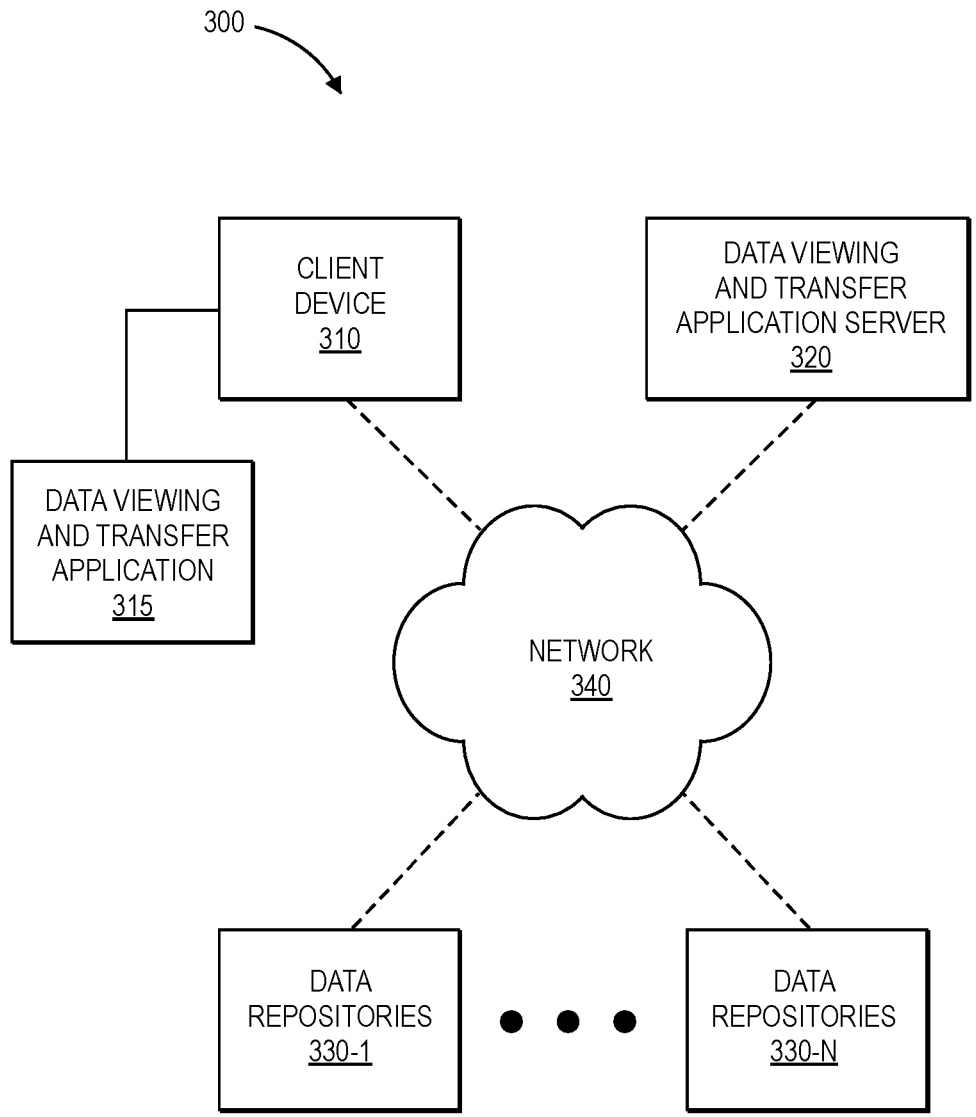
FIG. 3 illustrates an example environment in accordance with aspects of the present disclosure.

FIG. 3 illustrates an example environment in accordance with aspects of the present disclosure. As shown in FIG. 3, environment 300 includes a client device 310, a data viewing and transfer application server 320, data repositories 330-1 through 330-N (in which N is an integer great than or equal to 2), and a network 340.

The client device 310 may include a computing device capable of communicating via a network, such as the network 340. In example embodiments, the client device 310 may be a portable computer device (e.g., a laptop or a tablet computer), a desktop computer, a server device, and/or another type of computing device.

In some embodiments, the client device 310 may host a data viewing and transfer application 315 for accessing and viewing data stored by multiple different data repositories 330 (e.g., oil and gas-related data, such as oil well header data, or the like). In this regard, the client device 310 may communicate with the data viewing and transfer application server 320 to facilitate the operations of the data viewing and transfer application 315 used to view and compare data stored by disparate data sources (e.g., the data repositories 330). For example, a user may interface with a user interface of the data viewing and transfer application 315 to provide user input with respect to user selections of data properties to compare, geographic location selections associated with the data, user instructions to transfer and/or merge selected data between repositories, etc. The client device 310 may communicate with the data viewing and transfer application server 320 to process the user inputs, present information within the user interface of the data viewing and transfer application 315, transfer selected data between repositories, etc.

The data viewing and transfer application server 320 may include one or more computing devices that communicates with the client device 310 for supporting the operations of a data viewing and transfer application 315 used to compare different types of data and transfer data between repositories. In some embodiments, the data viewing and transfer application server 320 may access datasets from different repositories (e.g., data repositories 330), access data structure format information defining the structure of the format of the different datasets, receive a user section of data properties to compare (e.g., from the client device 310 via the data viewing and transfer application 315), identify the selected properties in each dataset, identify matches and mismatches within the datasets (e.g., which datasets include data with the selected properties, and which datasets do not include the data with the selected properties), and present the dataset matches and mismatches (e.g., via the data viewing and transfer application 315 hosted by the client device 310). In some embodiments, the data viewing and transfer application server 320 may receive user instruction (e.g., via the data viewing and transfer application 315) to transfer selected data between the repositories. Based on receiving the transfer instruction, the data viewing and transfer application server 320 may communicate with the data repositories 330 to process and complete the transfer of the data in accordance with the transfer instruction.

The data repositories 330 may include one or more repositories hosted by one or more computing devices. In some embodiments, the data repositories 330 may store any variety of data in any type of structure or format. In one example embodiment, the data repositories 330 may store well header data. The data repositories 330 may provide well header data to the data viewing and transfer application server 320 in facilitating the operations of the data viewing and transfer application 315, as described herein. In some embodiments, the data repositories 330 may transfer data from one data repository 330 to another data repository 330 based on receiving an instruction from the data viewing and transfer application server 320.

The network 340 may include network nodes and one or more wired and/or wireless networks. For example, the network 340 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 340 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 340 may include copper transmission cables, optical transmission fibers, wireless transmission, routers, firewalls, switches, gateway computers and/or edge servers.

The quantity of devices and/or networks in the environment 300 is not limited to what is shown in FIG. 3. In practice, the environment 300 may include additional devices and/or networks; fewer devices and/or networks; different devices and/or networks; or differently arranged devices and/or networks than illustrated in FIG. 3. Also, in some implementations, one or more of the devices of the environment 300 may perform one or more functions described as being performed by another one or more of the devices of the environment 300. Devices of the environment 300 may interconnect via wired connections, wireless connections, or a combination of wired and wireless connections.

Figure 4:
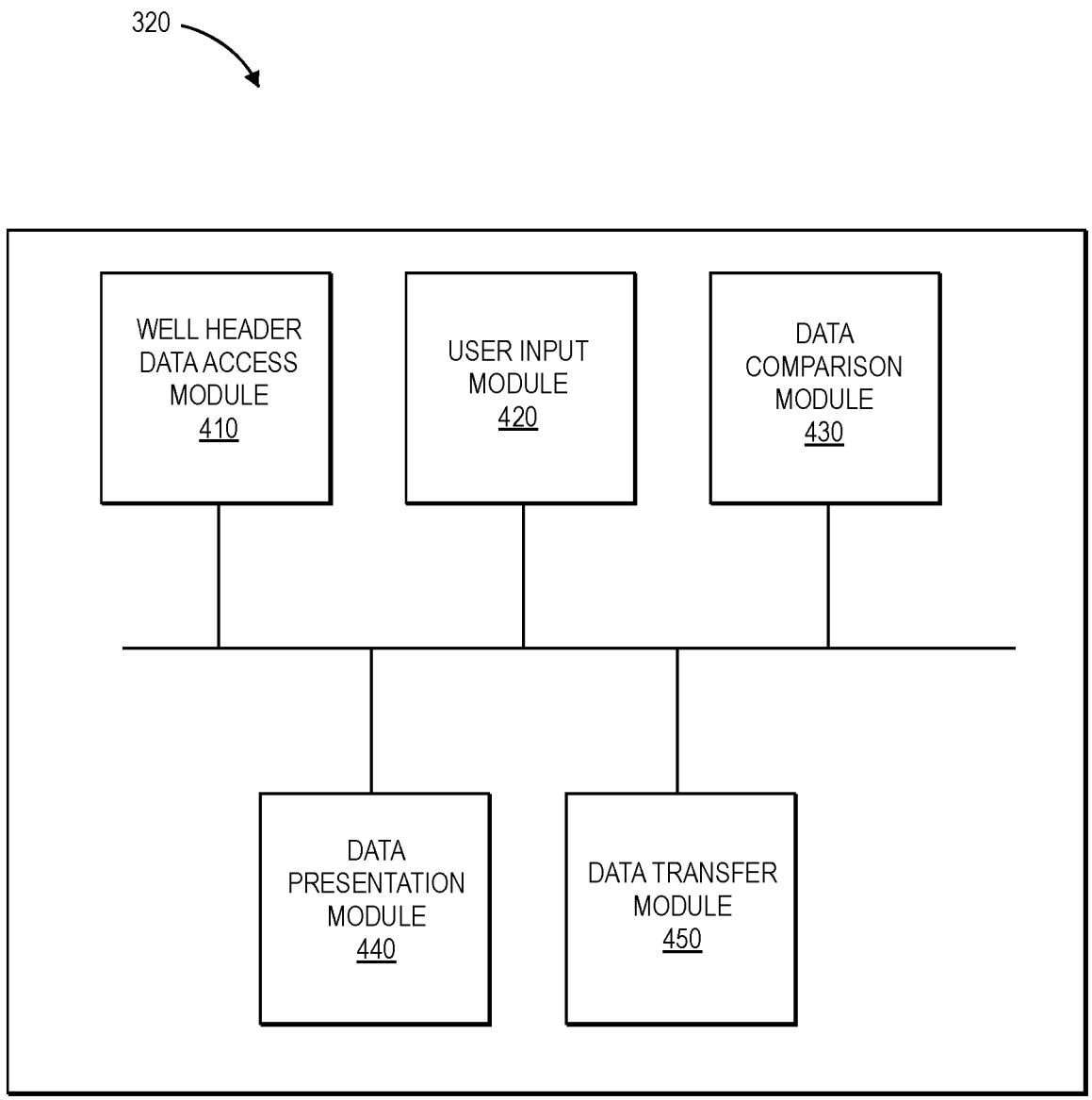
FIG. 4 illustrates a block diagram of example components of a data viewing and transfer application server in accordance with aspects of the present disclosure.

FIG. 4 illustrates a block diagram of example components of a data viewing and transfer application server in accordance with aspects of the present disclosure. As shown in FIG. 4, the data viewing and transfer application server 320 includes a well header data access module 410, a user input module 420, a data comparison module 430, a data presentation module 440, and a data transfer module 450. In embodiments, the data viewing and transfer application server 320 may include additional or fewer components than those shown in FIG. 4. In embodiments, separate components may be integrated into a single computing component or module. Additionally, or alternatively, a single component may be implemented as multiple computing components or modules.

The well header data access module 410 may communicate with the data repositories 330 to access well header data stored in the data repositories 330. In some embodiments, the well header data access module 410 may also obtain information identifying the respective formats of the data structures storing the well header data. As described herein, the data viewing and transfer application server 320 may access the well header data in connection with facilitating the operations of the data viewing and transfer application 315 and presenting the well header data to a user via a user interface of the data viewing and transfer application 315.

The user input module 420 may receive user input from the client device 310 (e.g., via the data viewing and transfer application 315). In some embodiments, the user input may include selections of a geographic area on a map, selections of data properties to compare between data repositories, selections of data to transfer, and the like. As described herein, the data viewing and transfer application server 320 may process the user inputs for presenting the well header data and/or transferring the well header data in accordance with the user inputs.

The data comparison module 430 may identify the well header properties (e.g., selected by the user and received by the user input module 420) by using the data structure format information (e.g., obtained by the well header data access module 410). In some embodiments, the data structure format information may identify which data in each of the well header datasets corresponds to the selected properties. In effect, the different well header datasets may be standardized using the data structure format information. In some embodiments, the data comparison module 430 may further compare the data associated with identified properties and identify which data between the well head datasets match and do not match (e.g., to within a configurable threshold degree).

The data presentation module 440 may present the dataset matches and mismatches in user interface and a mapping application (e.g., similar to that shown in FIG. 2). In some embodiments, the matches and mismatches may be differentiated by icons different patterns, colors, shadings, images, etc. In this way, the user may more clearly identify the wells.

The data transfer module 450 may transfer data between the data repositories 330. More specifically, the data transfer module 450 may transfer data between the data repositories 330 based on user selections received by the user input module 420. As described herein, the user may view (e.g., within a user interface of the data viewing and transfer application 315) matches and mismatches between the well header data and may select to transfer data that is included in one repository to data that is not included in a different repository. Based on this user instruction, the data transfer module 450 may initiate a transfer of the data by directing an origin data repository 330 to transfer a copy of the selected data to a selected target data repository 330.

Figure 5:
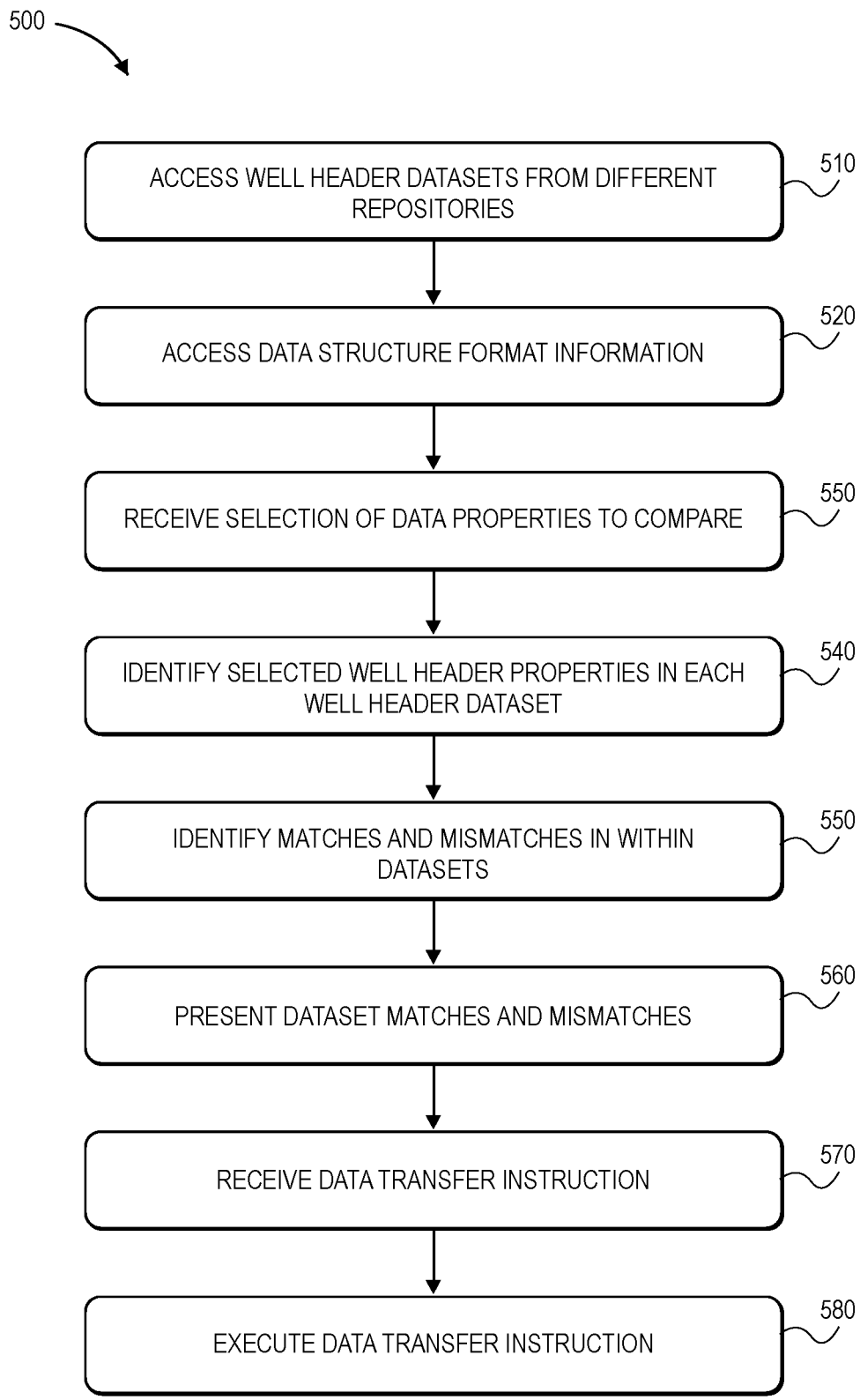
FIG. 5 illustrates an example flowchart for identifying matches and mismatches in well header datasets from different repositories and presenting the matches and mismatches.

FIG. 5 illustrates an example flowchart for identifying matches and mismatches in well header datasets from different repositories and presenting the matches and mismatches. The process 500 shown in FIG. 5 may be performed by a computing device, such a data viewing and transfer application server 320.

As shown in FIG. 5, the process 500 may include accessing well header datasets from different repositories (e.g., as at 510). For example, the data viewing and transfer application server 320 may access well header datasets from multiple different repositories associated with different software applications and different phases of oil production (e.g., exploration, development and production). As described herein, the different well header datasets may be in different formats and structured differently.

The process 500 may further include accessing data structure format information (e.g., as at 520). For example, the data viewing and transfer application server 320 may access information that identifies the format and manner in which data from the different well header datasets are stored.

The process 500 may also include receiving a selection of data properties to compare (e.g., as at 530). For example, the data viewing and transfer application server 320 may receive a selection, via a user interface, of a type of data property to compare between the different well header datasets (e.g., well top location data, well-state—DRY, ACTIVE, OIL PRODUCING, etc.). In some embodiments, the data viewing and transfer application server 320 may also receive a selection of a geographic area (e.g., via a mapping interface incorporated within the data viewing and transfer application 315) associated with the different well header datasets.

The process 500 may further include identifying well header properties in each well header data set (e.g., as at 540). For example, the data viewing and transfer application server 320 may identify the well header properties (e.g., selected as at 550) by using the data structure format information (e.g., from block 520). In some embodiments, the data structure format information may identify which data in each of the well header datasets corresponds to the selected properties. In effect, the different well header datasets may be standardized using the data structure format information.

The process 500 may also include identifying matches and mismatches within the datasets (e.g., as at 550). For example, the data viewing and transfer application server 320 may compare the data associated with identified properties and identify which data between the well head datasets match and do not match (e.g., to within a configurable threshold degree).

The process 500 may further include presenting the dataset matches and mismatches (e.g., as at 560). For example, the data viewing and transfer application server 320 may present the dataset matches and mismatches in a data viewing and transfer application 315 (e.g., similar to that shown in FIG. 2). In some embodiments, the matches and mismatches of the well datasets may be represented as datapoints (e.g., on a mapping interface of the data viewing and transfer application 315) that are differentiated by icons different patterns, colors, shadings, images, etc. In this way, the user may more clearly identify the repositories having well data with a selected set of properties. Further, the user may apply filters on each repository to narrow down wells list. This filter can be applied on a selected set of properties.

The process 500 may also include receiving a data transfer instruction (as at 570). For example, the data viewing and transfer application server 320 may receive a transfer instruction in the form of user inputs received via the user interface of the data viewing and transfer application 315. More specifically, the user may select a datapoint representing data that is included in one data repository 330 (e.g., an origin data repository 330) and not included in another repository (e.g., a target data repository 330). Further, the user may provide a user input to initiate a transfer from the origin data repository 330 to the target data repository 330.

The process 500 may further include executing the data transfer instruction (as at 580). For example, the data viewing and transfer application server 320 may instruct the origin data repository 330 to transfer the selected dataset to the target data repository 330. In some embodiments, executing the data transfer may involve providing the origin data repository 330 with authentication information to authenticate the data viewing and transfer application server 320 (e.g., to prevent the origin data repository 330 from executing a transfer instruction received from an unauthorized party). Any variety of suitable authentication and/or security measures may be incorporated as part of executing the data transfer (e.g., credential verification, encryption/decryption of verification data, hash matching, etc.).

Figure 6:
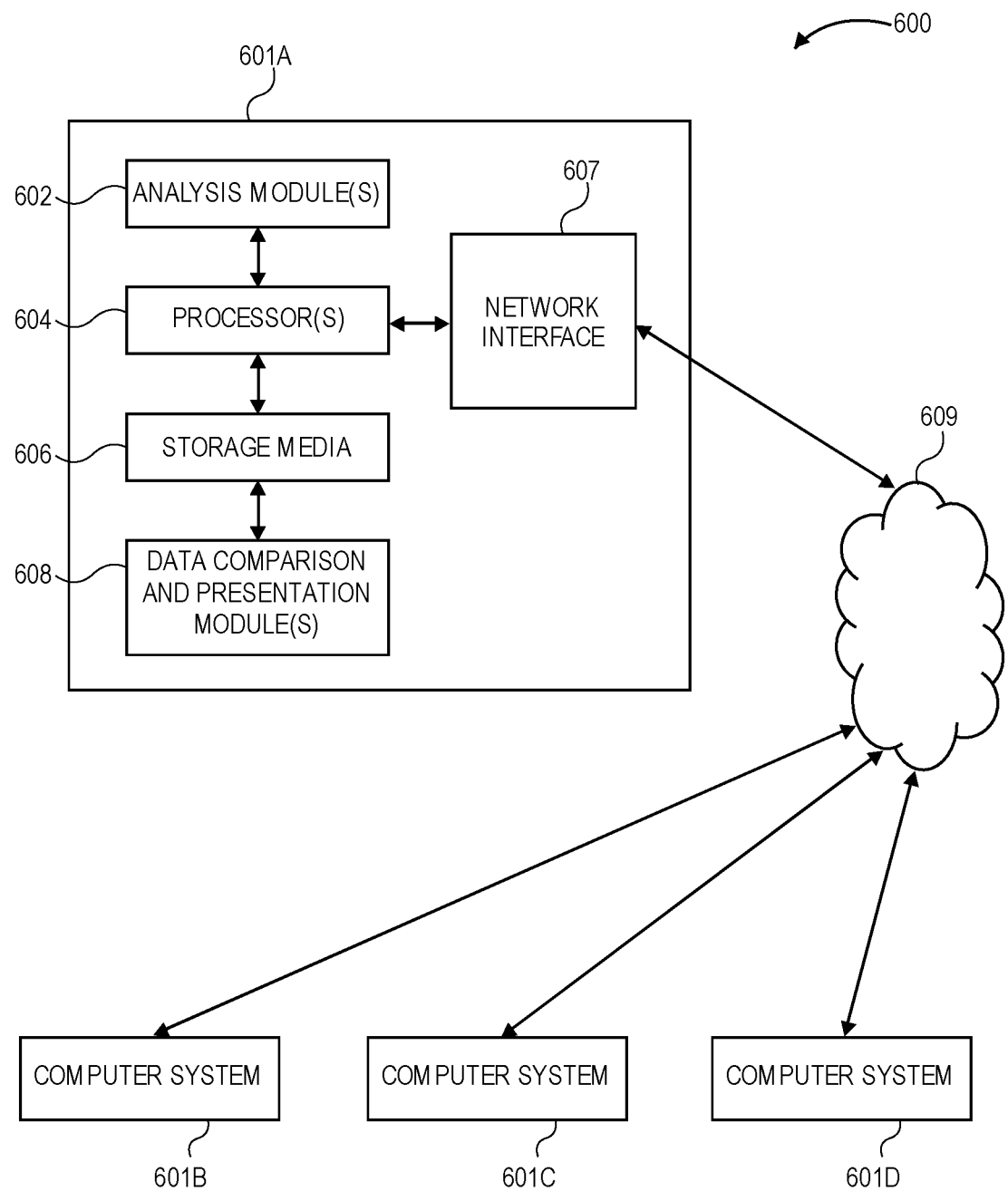
FIG. 6 illustrates a schematic view of a computing system, according to an embodiment.

In some embodiments, the methods of the present disclosure may be executed by a computing system. FIG. 6 illustrates an example of such a computing system 600, in accordance with some embodiments. The computing system 600 may include a computer or computer system 601A, which may be an individual computer system 601A or an arrangement of distributed computer systems. The computer system 601A includes one or more analysis modules 602 that are configured to perform various tasks according to some embodiments, such as one or more methods disclosed herein. To perform these various tasks, the analysis module 602 executes independently, or in coordination with, one or more processors 604, which is (or are) connected to one or more storage media 606. The processor(s) 604 is (or are) also connected to a network interface 607 to allow the computer system 601A to communicate over a data network 609 with one or more additional computer systems and/or computing systems, such as 601B, 601C, and/or 601D (note that computer systems 601B, 601C and/or 601D may or may not share the same architecture as computer system 601A, and may be located in different physical locations, e.g., computer systems 601A and 601B may be located in a processing facility, while in communication with one or more computer systems such as 601C and/or 601D that are located in one or more data centers, and/or located in varying countries on different continents).

A processor may include a microprocessor, microcontroller, processor module or subsystem, programmable integrated circuit, programmable gate array, or another control or computing device.

The storage media 606 may be implemented as one or more computer-readable or machine-readable storage media. Note that while in the example embodiment of FIG. 6 storage media 606 is depicted as within computer system 601A, in some embodiments, storage media 606 may be distributed within and/or across multiple internal and/or external enclosures of computing system 601A and/or additional computing systems. Storage media 606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 600 contains one or more data comparison and presentation module(s) 608. In the example of computing system 600, computer system 601A includes the data comparison and presentation module 608. In some embodiments, a single data comparison and presentation module 608 may be used to perform some aspects of one or more embodiments of the methods disclosed herein. In other embodiments, a plurality of data comparison and presentation modules 608 may be used to perform some aspects of methods herein.

It should be appreciated that computing system 600 is merely one example of a computing system, and that computing system 600 may have more or fewer components than shown, may combine additional components not depicted in the example embodiment of FIG. 6, and/or computing system 600 may have a different configuration or arrangement of the components depicted in FIG. 6. The various components shown in FIG. 6 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 600, FIG. 6), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A method comprising:
accessing a first well header dataset from a first repository;
accessing a second well header dataset from a second repository;
accessing data structure format information that identifies a format and a manner in which the first and second well header datasets are stored;
identifying well header properties in the first and second well header datasets, wherein the well header properties are identified based upon the data structure format information to standardize a format and a structure of the first and second well header datasets;
identifying matches and mismatches between the first well header dataset and the second well header dataset, wherein the matches and mismatches are identified based upon the data structure format information, wherein the first well header dataset and the second well header dataset have a same data type with a selected set of properties; and
presenting, within a mapping interface, graphical representations of the matches and mismatches between the data within the first well header dataset and the data within the second well header dataset, wherein the graphical representations of the matches and mismatches are differentiated by graphical icons having at least one of: different colors, different patterns, different shadings, or different images.

2. The method of claim 1, wherein the first and second repositories are associated with different software applications.

3. The method of claim 1, first and second repositories are associated with different phases of oil production.

4. The method of claim 1, further comprising standardizing the first well header dataset and the second well header dataset using the data structure format information that identifies the format and manner in which data from the first well header dataset and the second well header dataset are stored, wherein the identifying the matches and the mismatches is based on the standardizing.

5. The method of claim 1, further comprising receiving a selection of data properties to compare between the data within the first well header dataset and the data within the second well header dataset, wherein the identifying the matches and mismatches comprises identifying matches and mismatches between the selected data properties between the data within the first well header dataset and the data within the second well header dataset.

6. The method of claim 1, further comprising:
receiving a selection via the mapping interface of data to transfer from the first repository to the second repository; and
initiating the transfer of the selected data from the first repository to the second repository, wherein prior to the transfer, the selected data is included in the first repository and not included in the second repository.

7. The method of claim 1, wherein the first and second well header datasets are formatted differently and structured differently in the first and second repositories.

8. The method of claim 1, wherein the well header properties comprise dry, active, oil producing, or a combination thereof.

9. The method of claim 1, further comprising receiving a selection of data properties to compare, wherein the selection of data properties comprises well top location data, well state data, or both, and wherein the data structure format information identifies which portions on the first and second well header datasets correspond to the selection of data properties.

10. The method of claim 1, further comprising receiving a geographic area associated with the first and second well header datasets, wherein the data structure format information identifies which portions on the first and second well header datasets correspond to the geographic area.

11. The method of claim 1, further comprising receiving a data transfer instruction, wherein the data transfer instruction selects a datapoint representing data in the first well header dataset and not in the second well header dataset, and wherein the data transfer instruction transfers the datapoint into the second well header dataset such that the datapoint becomes viewable in the mapping interface as a match between the first and second well header datasets.

12. A computing system, comprising:
one or more processors; and
a memory system comprising one or more non-transitory computer-readable media storing instructions that, when executed by at least one of the one or more processors, cause the computing system to perform operations, the operations comprising:
accessing a first well header dataset from a first repository;

accessing a second well header dataset from a second repository;

accessing data structure format information that identifies a format and a manner in which the first and second well header datasets are stored;

identifying well header properties in the first and second well header datasets, wherein the well header properties are identified based upon the data structure format information to standardize a format and a structure of the first and second well header datasets;

identifying matches and mismatches between the first well header dataset and the second well header dataset, wherein the matches and mismatches are identified based upon the data structure format information, wherein the first well header dataset and data within the second well header dataset have a same data type with a selected set of properties; and presenting, within a mapping interface, graphical representations of the matches and mismatches between the data within the first well header dataset and the data within the second well header dataset, wherein the graphical representations of the matches and mismatches are differentiated by graphical icons having at least one of: different colors, different patterns, different shadings, or different images.

13. The computing system of claim 12, wherein the first and second repositories are associated with different software applications.

14. The computing system of claim 12, first and second repositories are associated with different phases of oil production.

15. The computing system of claim 12, wherein the operations further comprise standardizing the first well header dataset and the second well header dataset using data structure format information that identifies the format and manner in which data from the first well header dataset and the second well header dataset are stored, wherein the identifying the matches and the mismatches is based on the standardizing.

16. The computing system of claim 12, wherein the operations further comprise receiving a selection of data properties to compare between the data within the first well header dataset and the data within the second well header dataset, wherein the identifying the matches and mismatches comprises identifying matches and mismatches between the selected data properties between the data within the first well header dataset and the data within the second well header dataset.

17. The computing system of claim 12, wherein the operations further comprise:

receiving a selection via the mapping interface of data to transfer from the first repository to the second repository; and initiating the transfer of the selected data from the first repository to the second repository, wherein prior to the transfer, the selected data is included in the first repository and not included in the second repository.

18. A method comprising:

accessing a first well header dataset from a first repository;

accessing a second well header dataset from a second repository, wherein the first and second well header datasets are associated with different software applications and different phases of oil production, and wherein the first and second well header datasets are formatted differently and structured differently;

accessing data structure format information that identifies a format and a manner in which the first and second well header datasets are stored;

receiving a selection of data properties to compare, wherein the selection of data properties comprises well top location data, well state data, or both;

receiving a geographic area associated with the first and second well header datasets;

identifying well header properties in the first and second well header datasets, wherein the well header properties are identified based upon the data structure format information to standardize the formatting and the structure of the first and second well header datasets, and wherein the data structure format information identifies which portions on the first and second well header datasets correspond to the selection of data properties and the geographic area;

identifying matches and mismatches between the first well header dataset and the second well header dataset, wherein the matches and mismatches are identified based upon the data structure format information, wherein the first well header dataset and the second well header dataset have a same data type with the selection of data properties;

presenting, within a mapping interface, graphical representations of the matches and mismatches between the data within the first well header dataset and the data within the second well header dataset, wherein the graphical representations of the matches and mismatches are differentiated by graphical icons having at least one of: different colors, different patterns, different shadings, or different images; and receiving a data transfer instruction, wherein the data transfer instruction selects a datapoint representing data in the first well header dataset and not in the second well header dataset, and wherein the data transfer instruction transfers the datapoint into the second well header dataset such that the datapoint becomes viewable in the mapping interface as a match between the first and second well header datasets.

* * * * *